United States Patent [19]

Bayen et al.

[11] 4,346,726
[45] Aug. 31, 1982

[54] METHOD OF DRYING PIPELINES AND PUTTING GAS THEREINTO

[75] Inventors: Jean Bayen, Fanconville; Patrick Scemama, Paris, both of France

[73] Assignee: Pipeline Service, Puteaux, France

[21] Appl. No.: 103,226

[22] Filed: Dec. 12, 1979

[30] Foreign Application Priority Data

Dec. 18, 1978 [FR] France ............................ 78 35499

[51] Int. Cl.³ .................................................. F17D 1/02
[52] U.S. Cl. ............................................ 137/15; 137/205; 15/409; 134/21; 134/22 C
[58] Field of Search ............. 15/409, 104.06 R; 134/21, 22 R, 22 C; 62/292; 137/15, 240, 205

[56] References Cited

U.S. PATENT DOCUMENTS

| | | | |
|---|---|---|---|
| 681,854 | 9/1901 | Howe | 15/409 X |
| 1,135,834 | 4/1915 | Morton | 15/409 X |
| 1,203,841 | 11/1916 | Bancel | 15/409 X |
| 1,447,103 | 2/1923 | Schmidt | 15/409 X |
| 1,784,222 | 12/1930 | Crickmer | 15/409 X |
| 3,435,841 | 4/1969 | Williams | 137/705 X |
| 3,695,055 | 10/1972 | Bruce | 62/692 X |
| 3,926,664 | 12/1975 | Verreydt | 134/22 C X |
| 4,016,896 | 4/1947 | Oikarinen | 137/205 |

Primary Examiner—Alan Cohan
Attorney, Agent, or Firm—Browdy and Niemark

[57] ABSTRACT

The invention relates to total elimination of aqueous deposits in pipelines intended for transporting gaseous fluids, such as a natural gas. The method involves sending, by a nozzle at an end of at least one compressed air ejector, connected with the pipeline, a pressurized driving fluid (for example, under 4 to 8 bars) into a pipeline which aspirates and entrains the gaseous fluid (air+water vapor), the mixture of fluids then being discharged at the other end of the ejector. In practice, multistage ejectors for example three ejectors in series, are used. According to a variant of the method, the step of putting gas which is to be transported into the pipeline is done while the vacuum is maintained in the ejector or ejectors so as always to be outside the limits of flammability of this gas. The method is particularly suitable for drying natural gas pipelines and then putting the pipelines under pressure.

6 Claims, 3 Drawing Figures

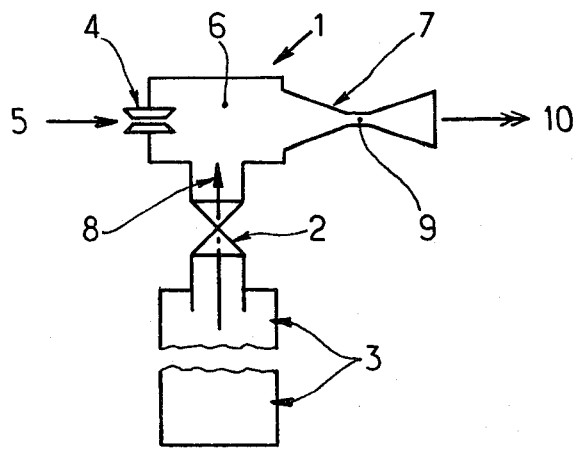
Fig:1
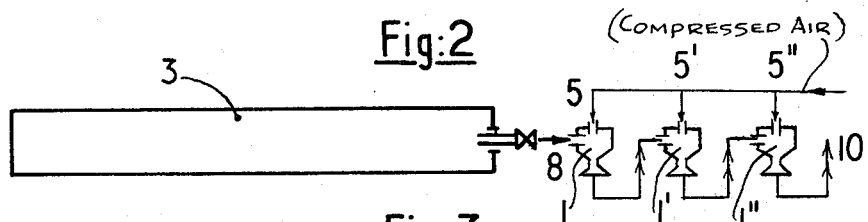
Fig:2
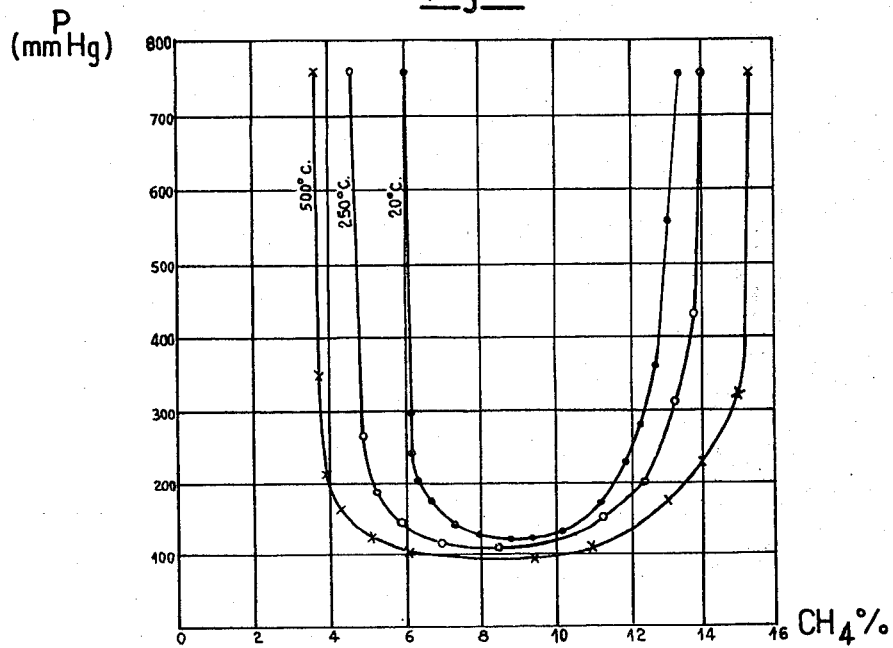
Fig:3

METHOD OF DRYING PIPELINES AND PUTTING GAS THEREINTO

BACKGROUND OF THE INVENTION

This invention relates to the field of elimination of aqueous deposits, particularly water, from pipelines intended for transporting gaseous fluid, as for example, natural gas. The invention relates more particularly to a new method utilizing a vacuum to dry the pipelines and facilitating putting gas into the pipelines without risk from the flammability of the transported gas and formation of explosive mixtures with oxygen.

Cleaning and drying of gas transport pipelines have always posed problems due particularly to the presence of moisture and the later consequences thereof, stemming from the formation of muds, rust and the like. Since the first gas pipelines were put into service, operators have run into difficulties due to plugging phenomenae, which were ascribed originally to the formation of ice created by the intense and localized cooling of the gas. Later the phenomenae were attributed to the presence of gas hydrates (such as $CH_4.7H_2O$, $C_2H_6.8H_2O$ and $C_3H_8.18H_2O$) able to grow as crystals until these crystals blocked the pipes completely.

A technique now known and used to eliminate and/or to prevent such hydrate plugs consists of injecting into the pipeline an organic product which is absorbent of water and miscible with it, as for example, methanol or ethylene glycol, to constitute plugs which are pushed all along the pipeline to be dried. This known technique, costly and difficult to use, quite often achieves imperfect results. Furthermore, a large amount of dirtied organic products have to be recovered and then separated either by burning or as wastes which of themselves cause pollution.

A better and more effective technique, which has been tested by applicants, consists of performing the drying by vacuum which makes it possible to avoid supplying and consumption of costly materials, as is necessary when purging with pure nitrogen, methanol, cooling water or the like. According to this process, multistage, sliding-vane vacuum pumps, driven by diesel engines, are used to avoid consumption of electricity. After a descent to a vacuum condition which makes it possible to evacuate virtually all the air from a pipeline, the drying is performed under a practically constant absolute pressure until virtually complete elimination of the moisture. Such a technique certainly represents an advance but still is relatively expensive because of the equipment used and high maintenance costs.

SUMMARY OF THE INVENTION

It is the principal object of the present invention to provide a method of drying a pipeline by vacuum which is inexpensive, effective, and overcomes the shortcomings mentioned above.

It is another object of the present invention to provide a method of drying a pipeline by vacuum which uses simplified equipment with better efficiency.

It is an additional object of the present invention to provide, in conjunction with the new method of drying a pipeline, a filling of the pipeline with gas under pressure.

According to its most general form, the method of the present invention involves injecting by a nozzle, at an end of a device connected to the pipeline, a pressurized driving fluid that aspirates and entrains gaseous fluid from the pipeline, the mixture of fluids then being discharged at the other end of the device.

In a preferred embodiment, the device connected to the pipeline is advantageously made up of a compressed air ejector provided with an aspiration chamber which opens on a diffuser made up of a system of convergent-divergent cones from which the mixture of gaseous fluids escape into the atmosphere.

In practice, a simple or multistage ejector system is used, for example several ejectors placed in series to reach, by stages, a progressively higher vacuum as is to be explained below.

During operation, the driving fluid (for example, compressed air) is expanded from its initial pressure to a pressure close to that of the secondary fluid contained in the pipeline, that is a mixture of air and water vapor at aspiration pressure. During expansion, the driving fluid is accelerated, its speed going from a relatively low value at the input of the injection nozzle (corresponding to a pressure of several bars) to a very high value at the level of the diffuser, the driving fluid being able to reach 800 to 900 meters per second in the diffuser. In the aspiration chamber, the driving fluid establishes a low-pressure and high-speed flow zone which tends to entrain the secondary fluid and mix it with the driving fluid. During this mixing, the velocity of the driving fluid is slowed down while that of the secondary fluid is accelerated. When the mixture enters the diffuser, it is compressed by the convergent-divergent system to the discharge pressure by rapid deceleration. The ejector thus has the role of aspirating and compressing a certain mass of fluid brought from aspiration pressure to discharge pressure.

The new drying method according to the present invention achieves notable advantages in relation to the known techniques mentioned above, including the vacuum pump process. Among the advantages achieved are:

the absence of intermediate condensers and cooling water;

the use of a simple, robust equipment, without moving parts which are low in cost both to purchase and maintain;

the sole use of driving fluid, for example, compressed air, which may or may not be cooled;

the possibility of obtaining very high vacuums, as high as with standard vacuum pumps, for a very simple operation; and the ability to treat large volumes of gas with very small size equipment.

According to another important application, the method of the present invention makes it possible, after drying, to fill the pipeline with gas with total safety, because it is easy to be outside the zone of flammability of this gas such as, for example, natural gas.

According to this further improvement, the residual air is displaced from the pipeline by intake of the suitable gas at the opposite end, while maintaining in the ejector device a vacuum corresponding to a pressure less than that where the curves of the upper and lower limits of flammability of said gas meet, putting the pipeline under suitable pressure, eliminating the vacuum only when the gas being put into the pipeline reaches the ejector device.

BRIEF DESCRIPTION OF THE DRAWINGS

FIG. 1 is a somewhat diagramatic illustration of an apparatus coupled to an end of a pipeline, this apparatus being suitable for carrying out the method of drying a pipeline according to the present invention.

FIG. 2 is a somewhat diagramatic illustration of an apparatus coupled to an end of a pipeline, the apparatus being particularly suitable for carrying out an alternative method of drying a very long pipeline according to the present invention.

FIG. 3 illustrates graphically the pressure vs CH$_4$% characteristics at three temperatures.

DETAILED DESCRIPTION OF THE PREFERRED EMBODIMENTS

It will be noted first all that generally, before drying a gas pipeline, it is necessary or desirable to eliminate rust, scale, and a part of the water and deposits of various origins, such as welding residues and the like. This can advantageously be performed by causing a certain number of scrapers, for example, scrapers provided with metal cups and brushes and thereafter thermoplastic foam to travel in the pipeline at a determined speed to eliminate most of the dirt and leaving, in effect in the pipeline, only a film of water whose thickness generally varies from 50 to 100 microns.

As can be seen in FIG. 1, vacuum drying is performed by at least one compressed air ejector 1 connected, for example, by a valve 2, to a pipeline 3 to be dried. In its most elementary form shown in FIG. 1, the single ejector 1 comprises a nozzle 4 for injection of driving air 5, an aspiration chamber 6 and a diffuser 7 of the convergent-divergent cone type. The driving air injected at 5 is made up, for example, of air compressed from about 4 to about 7 or 8 bars which, in an expansion chamber 6, causes aspiration of the secondary fluid mixture of air and water vapor, designated by arrow-headed line 8, contained in the pipeline 3. As explained above, during mixing in the chamber 6, the driving fluid 5 is slowed down while the aspirated secondary fluid 8 is accelerated and, when the mixture reaches the diffuser 7, it is compressed at throat 9 to the discharge pressure by rapid deceleration, then the secondary fluid escapes as designated by arrow-headed line 10 at the output from the diffuser 7.

As shown diagrammatically in FIG. 2, it is generally necessary, particularly when a pipeline 3 of several dozens or hundreds of kilometers is involved, to multiply the number of stages of ejectors, for example, by installing several injectors 1,1', 1" in series, these injectors 1, 1', 1" being respectfully pressurized by driving air injected respectively at 5, 5', 5". Thus, it is possible to cover the whole range of vacuums or aspiration pressures from an initial aspiration pressure to substantially 100 torrs for one stage, 5 to 10 torrs for two stages, 1 to 5 torrs for three stages, without the need of a condenser between the stages when compressed air is used as the driving fluid.

During the drying operation, descent to a vacuum is effected gradually, by stages until total elimination of air and water contained in the pipeline 3 is achieved. The time is obviously a function of the characteristics of the specific pipeline 3 such as length, cross-section and the like. For example, for a natural gas pipeline 3 of a length of 500 kilometers and a cross-section of 0.66 m$^2$, a total volume of 328,350 m$^3$ containing 143,600 kilograms of water or a film having a thickness of about 100 g/m$^2$, the total drying time is about 48 days for a compressed air consumption of about 9000 Nm$^3$/h under 6 to 7 bars. The descent in pressure from atmosphere to 100 torrs is made by two ejectors 1, 1' in series and requires about 50 hours; passage form 100 to 10 torrs corresponds to about 130 hours for two ejectors 1, 1' in series and the final drying, for example, under 6.5 torrs, requires about 970 hours.

According to another characteristic of the invention, filling the pipeline 3 with the gas which is to be transported therein, after drying, is done as explained above during the final phase of high vacuum at the level of the ejectors 1,1',1". This makes it possible to obtain total safety during input of the gas to be transported because the gas is outside its zone of flammability in the pipeline 3. There are shown, for example, in FIG. 3 characteristic curves of variation of the limits of flammability of methane, in various percentages, at temperatures of 20° C., 250° C., and 500° C., as a function of absolute pressure (see "Limits of Flammability of Gases and Vapors" by H. F. Coward and G. W. Jones, Bulletin 103 of the U. S. Bureau of Mines). As can be seen, the curves of the lower and upper limits meet at low pressure, the minimum being located at about 120 mm Hg at 20° C. and 95 mm at 500° C. Thus, at ambient temperature and a pressure below 90 mm Hg (or 9 torrs) no mixture of methane and air is flammable, regardless of the proportions of the ingredients. Filling of the pipeline with natural gas, for example, can, therefore, be done without danger of flammability up to 90 mm Hg. When this vacuum is reached, the partial pressure of the methane is then 60 mm Hg which corresponds to a proportion of methane in air greater than about 66%.

Thus, the mixture will always remain, under the conditions of use of the invention, outside of the zone of flammability when the pressure continues to mount since it is clearly to the right of the characteristic curves of FIG. 3. The method of the invention does consequently achieve great safety from an industrial stand point. It will be further noted that the method of the present invention has the advantage, particularly in the case of the pipelines transporting natural gas, of not requiring preliminary purging with nitrogen or any other inert carrier gas to eliminate any trace of oxygen which otherwise would form an exploding mixture with the gas which is to be transported.

Of course, the invention is not limited to the embodiments indicated above, given by way of non-limiting example, and extends to all variants falling particularly within the scope of the appended claims.

What is claimed is:

1. A method of vacuum drying of a pipeline which is to transport a gaseous fluid, the method comprising:
    connecting an ejector to one end of the pipeline, said ejector having a pressurized driving fluid injector nozzle, an aspiration chamber connected to the pipeline and a discharge port;
    injecting a pressurized driving fluid into said ejector, thereby aspiring and entraining the water vapor and residual air from the pipeline to produce a fluid mixture in the aspiration chamber which is thence discharged from the discharge port, said injecting step continuing until the phase of drying the pipeline is substantially complete;
    introducing the gas which is to be transported into the pipeline by displacing residual fluid from the pipeline by intake of the gas to be transported at the opposite end of the pipeline from that to which said ejector is coupled, while maintaining in the pipeline a vacuum corresponding to a pressure lower than the point at which the characteristic curves of the lower limits of flammability of the gas to be transported substantially meet;

putting the pipeline under suitable pressure; and disconnecting the ejector when said gas which is to be transported reaches the ejector.

2. The method according to claim 1, wherein the ejector comprises a compressed air ejector the discharge port of which comprises a diffuser with convergent-divergent cones.

3. The method according to claim 2, including connecting several ejectors in series to achieve stages of successive vacuum levels which go down to about 1 torr.

4. The method according to claim 2 or claim 3, wherein the driving fluid is compressed air under a pressure of between substantially 1 and substantially 20 bars.

5. The method according to claim 4, wherein said driving fluid is compressed air under a pressure of between substantially 4 and 8 bars.

6. The method of claim 1 or 2, including, subsequent to the drying phase, the step of charging the pipeline with natural gas.

* * * * *